United States Patent [19]
Upton et al.

[11] Patent Number: 5,941,278
[45] Date of Patent: Aug. 24, 1999

[54] CHECK VALVE

[75] Inventors: Hubert Allen Upton, Morgan Hill; Pablo Garcia, Stanford, both of Calif.

[73] Assignee: General Electric Company, Schenectady, N.Y.

[21] Appl. No.: 08/634,845

[22] Filed: Apr. 19, 1996

[51] Int. Cl.[6] .................................................. F16K 37/00
[52] U.S. Cl. .............. 137/554; 251/129.02; 251/129.11; 137/527.8
[58] Field of Search ...................... 251/129.02, 129.11; 137/554, 527.8

[56] References Cited

U.S. PATENT DOCUMENTS

| | | | |
|---|---|---|---|
| 3,602,254 | 8/1971 | Fawkes ................................. | 137/554 |
| 3,883,111 | 5/1975 | Jourdan . | |
| 4,618,824 | 10/1986 | Magee et al. . | |
| 5,140,263 | 8/1992 | Leon ..................................... | 137/554 |
| 5,144,977 | 9/1992 | Eggerton et al. ..................... | 137/554 |
| 5,154,080 | 10/1992 | Hill et al. ............................. | 137/554 |
| 5,193,568 | 3/1993 | Eissenberg et al. .................. | 137/554 |
| 5,236,011 | 8/1993 | Casada et al. ........................ | 137/554 |
| 5,295,503 | 3/1994 | Meyer et al. ......................... | 137/554 |

FOREIGN PATENT DOCUMENTS

| | | |
|---|---|---|
| 2 618 517 | 7/1987 | France . |
| 27 24 007 | 12/1978 | Germany . |
| 44 45 100 | 6/1996 | Germany . |
| 972870 | 10/1964 | United Kingdom . |

*Primary Examiner*—A. Michael Chambers
*Attorney, Agent, or Firm*—Armstrong, Teasdale, Schlafly & Davis

[57] ABSTRACT

A check valve for use in a GDCS of a nuclear reactor and having a motor driven disk including a rotatable armature for rotating the check valve disk over its entire range of motion is described. In one embodiment, the check valve includes a valve body having a coolant flow channel extending therethrough. The coolant flow channel includes an inlet end and an outlet end. A valve body seat is located on an inner surface of the valve body. The check valve further includes a disk assembly, sometimes referred to as the motor driven disc, having a counterweight and a disk shaped valve. The disk valve includes a disk base having a seat for seating with the valve body seat. The disk assembly further includes a first hinge pin member which extends at least partially through the disk assembly and is engaged to the disk. The disk valve is rotatable relative to the first hinge pin member. The check valve also includes a motor having a stator frame with a stator bore therein. An armature is rotatably positioned within the stator bore and the armature is coupled to the disk valve to cause the disk valve to rotate about its full range of motion.

15 Claims, 2 Drawing Sheets

CHECK VALVE

GOVERNMENT RIGHTS STATEMENT

The Government of the United States of America has rights in this invention pursuant to Contract No. DE-AC03-90SF18494 awarded by the Department of Energy.

FIELD OF THE INVENTION

This invention relates generally to check valves and, more particularly, to a biased-open testable check valve.

BACKGROUND OF THE INVENTION

A gravity driven cooling system (GDCS) is an emergency source of low pressure reactor coolant used following a loss of coolant event in at least one known boiling water reactor (BWR). A typical GDCS includes pools of coolant positioned so that when coolant from the pools must be supplied to the reactor pressure vessel (RPV), the coolant flows, under gravity forces, through the GDCS coolant delivery system into the RPV. Under normal reactor operating conditions, however, coolant from the GDCS does not flow into the RPV.

To prevent such unwanted GDCS coolant flow during normal reactor operations, a squib valve typically is positioned in the coolant delivery system of the GDCS. The squib valve remains closed, and prevents GDCS flow, under normal reactor operations. When the RPV water level falls below some predetermined magnitude and the RPV is depressurized, the GDCS squib valve opens and coolant from the GDCS pool flows into the RPV.

When coolant flows from the GDCS pool to the RPV, it is desirable to prevent backflow of water from the RPV into the GDCS pool if the RPV pressure is higher than the GDCS driving force. To prevent such backflow, a GDCS biased-open check valve typically is positioned in the GDCS coolant delivery system. The GDCS biased-open check valve prevents reactor coolant backflow from the RPV to the GDCS pool once the GDCS squib valve has opened, or fired, initiating GDCS flow.

The GDCS biased-open check valve is an important component of the GDCS and must perform its function reliably when required. To ensure that the biased-open check valve performs its function when required, periodic surveillance tests are performed on the check valve. If the check valve fails the surveillance tests due to a problem with the valve, e.g., check valve hinge pins are frozen in place, the valve is repaired or replaced.

A known biased-open check valve used for GDCS applications includes a disk attached to a rotatable shaft supported by bearing surfaces in the valve body. The disk restricts flow through the valve body and is normally open about 15 degrees. The disk may open to a maximum angle of 60 degrees. To prevent backflow, the disk closes the flow channel through the valve body by seating on a valve body seat.

To ensure the operability of GDCS check valves, full flow testing of installed check valves under design conditions typically is performed. The GDCS, however, cannot be operated while the reactor is in operation, otherwise a loss of coolant accident will result. Therefore, the GDCS check valves are typically tested during refueling outages. Specifically, during a refueling outage, and for each GDCS check valve, a backflow is injected through the valve to rotate the disk by 15 degrees to the closed position. If a valve does not close, then the valve is repaired or replaced.

Such backflow test, however, cannot be performed during normal reactor operation. Therefore, if any GDCS check valve failures occur during reactor operation, such failures may not be detected until the next reactor outage. In addition, with the above described test, the valve is not tested over its entire range of motion.

It would be desirable to test the GDCS check valves while the reactor is in operation, rather than only during refueling outages, and not interfere with valve operation if the check valves are required to function. It also would be desirable to stroke the valve disk of each GDCS check valve over its entire range of motion to ensure that the valve has a full range of operability.

SUMMARY OF THE INVENTION

These and other objects are attained by a check valve for use in a GDCS of a nuclear reactor and including a check valve disk assembly coupled to a rotatable magnetic armature of a motor for rotating the check valve disk assembly over its entire range of motion for testing. More specifically, and in one embodiment, the check valve includes a valve body having a coolant flow channel extending therethrough. The coolant flow channel includes an inlet end and an outlet end. A valve body seat is located on an inner surface of the valve body.

The check valve further includes a disk assembly including a counterweight having a dome portion, a flange, and a main body portion. The disk assembly also includes a disk base. The counterweight is secured to the disk base, and the disk base has a seat for seating with the valve body seat. When the disk assembly is in a closed position, the disk base seat is seated on the valve body seat to resist coolant flow in a direction from the valve outlet end to the valve inlet end. The disk assembly further includes a first disk pin insert secured within the counterweight main body portion.

A first hinge pin member extends at least partially through the counterweight main body portion and is rotatably engaged to the first disk pin insert. A bore extends through the first hinge pin member, and a rotatable shaft extends through the first hinge pin member bore and is connected at a first end to the first disk pin insert. The disk pin insert, disk and shaft are rotatable, together, relative to the first hinge pin member.

The check valve also includes a motor having a stator frame with a stator bore therein. The magnetic armature is rotatably positioned within the stator bore. The rotatable shaft is connected to the armature and is rotatable with the armature. The motor further includes a stator winding energizable to generate a rotating magnetic field that couples with a magnetic field of the armature and causes the armature to rotate.

At any time during reactor operation, and when it is desired to test the operability of the above described GDCS check valve, the stator winding is energized and a rotating magnetic field is generated. The rotating magnetic field couples with the magnetic field of the armature which causes the armature to rotate. The disk assembly can be fully rotated to its full open position, e.g., 60 degrees open, by energizing the motor winding in a first pole configuration, e.g., a first winding lead is energized positive and a second winding lead is energized negative. The disk assembly can also be fully rotated to its fully closed position by energizing the motor winding in a second pole configuration, e.g., the first winding lead is energized negative and the second winding lead is energized positive.

The above described motor driven GDCS testable check valve can be tested while the reactor is in operation, rather than only during refueling outages, and not interfere with valve operation if the check valve is required to function. Such GDCS check valve disk assembly also can be stroked over its entire range of motion to ensure that the valve has a full range of operability.

DETAILED DESCRIPTION OF THE DRAWINGS

Figure 1:
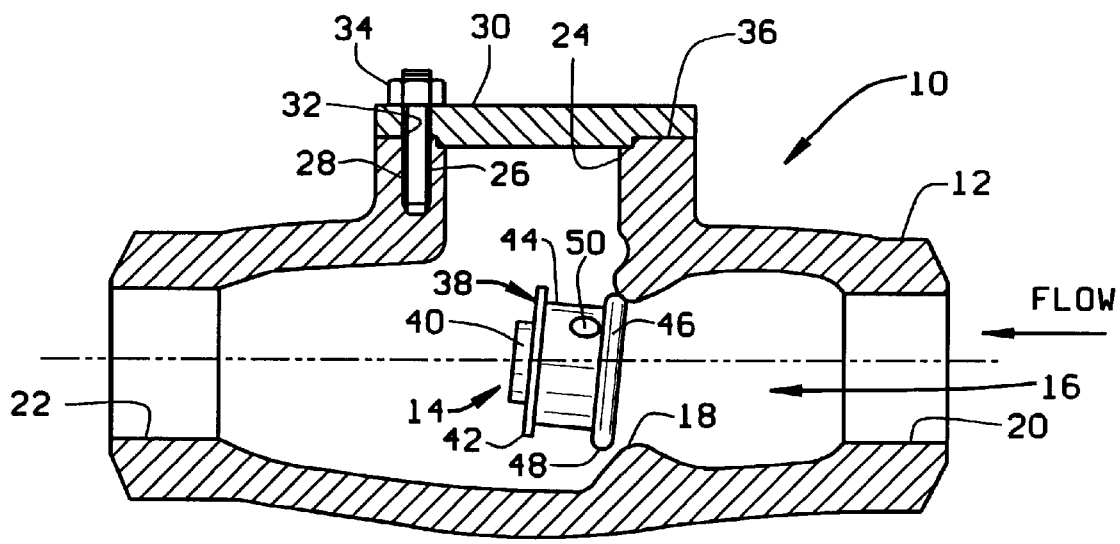
FIG. 1 is a cross section view of a GDCS check valve, including a check valve disk assembly open to about 15 degrees, in accordance with one embodiment of the present invention.

FIG. 1 is a cross section view of a GDCS check valve 10 in accordance with one embodiment of the present invention. Check valve 10 is particularly suitable for use in a gravity driven cooling system of a nuclear reactor, however, valve 10 can be used in other applications. Therefore, although valve 10 is sometimes described herein in the context of a nuclear reactor, it should be understood that valve 10 can be used in many other applications.

Referring specifically to FIG. 1, check valve 10 includes a valve body 12 and a disk assembly 14. Valve body 12 has a coolant flow channel 16 extending therethrough and a valve body seat 18 on an inner surface thereof. Coolant flow channel 16 includes an inlet end 20 and an outlet end 22.

Valve body 12 also includes a maintenance opening 24 to enable removal, repair and replacement of disk assembly 14. A threaded stud 26 is secured, such as by a press fit, within and extends from an opening 28 in valve body 12 and a removable cover 30 having an opening 32 which aligns with threaded stud 26 is secured to valve body 12 and closes opening 24. A nut 34 engages threaded stud 26 to maintain cover 30 over opening 24. A gasket 36 attached to cover 30 facilitates sealing opening 24.

Disk assembly 14 includes a counterweight 38 having a dome portion 40, a flange 42 and a main body portion 44. Disk assembly 14 also includes a disk base 46. Counterweight 38 is secured to disk base 46 and disk base 46 has a seat 48 for seating with valve body seat 18. When disk assembly 14 is in a closed position (not shown), disk base seat is seated 48 on valve body seat 18 to resist coolant flow in a direction from valve outlet end 22 to valve inlet end 20.

A first hinge pin member 50 also is shown in FIG. 1. Disk assembly 14 is rotatable about first hinge pin member 50. As described hereinafter in more detail, first hinge pin member 50 is secured to valve body 12.

With respect to operation of valve 10, when there is no pressure differential between outlet end 22 and inlet end 20, disk assembly 14 is about 15 degrees open as shown in FIG. 1. Having disk assembly 14 normally open at about 15 degrees under such conditions is achieved by selecting the location for first hinge pin member 50 relative to the center of gravity of disk assembly 14.

Figure 2:
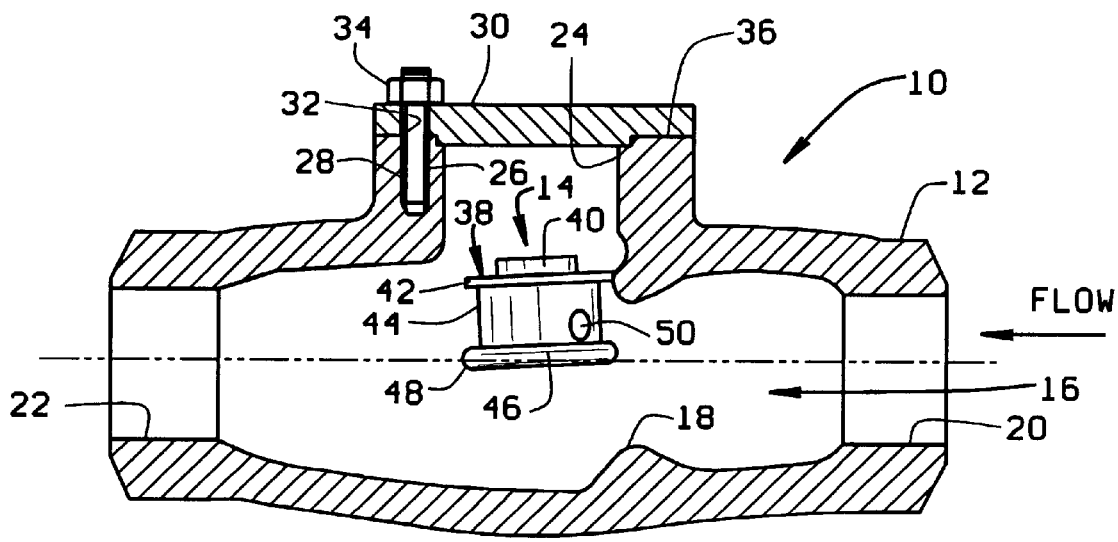
FIG. 2 is a cross section view of the GDCS check valve shown in FIG. 1 with the disk assembly open to approximately 60 degrees.

Although disk assembly 14 is normally about 15 degrees open as shown in FIG. 1, disk assembly 14 is rotatable to about 60 degrees open as shown in FIG. 2. By allowing disk assembly 14 to open to about 60 degrees, and under conditions in which coolant water must be quickly supplied to the reactor pressure vessel, disk assembly 14 can present minimal resistance to coolant flow.

When the pressure at the outlet end 22 exceeds the pressure at inlet end 20, disk assembly 14 closes by rotating on first hinge pin member 50 so that disk seat 48 seats on valve body seat 18. Under such circumstance, valve disk seat 48 and valve body seat 18 form a coolant resistant seal to prevent the flow of coolant in the direction from valve outlet end 22 to valve inlet end 20.

When closing, disk assembly 14 rotates quickly which reduces loud, potentially damaging slamming and vibration noises which typically occur when high velocity reverse flow is allowed to build up before completion of valve closing. In addition, disk assembly dome portion 40 facilitates avoiding hesitation of disk motion while closing, which is common with flat valve disks. In addition, first hinge pin 50 is located close to the center of gravity of disk assembly 14 and the disk assembly surfaces are open to the line fluid so that no dashpot action delays closing.

Figure 3:
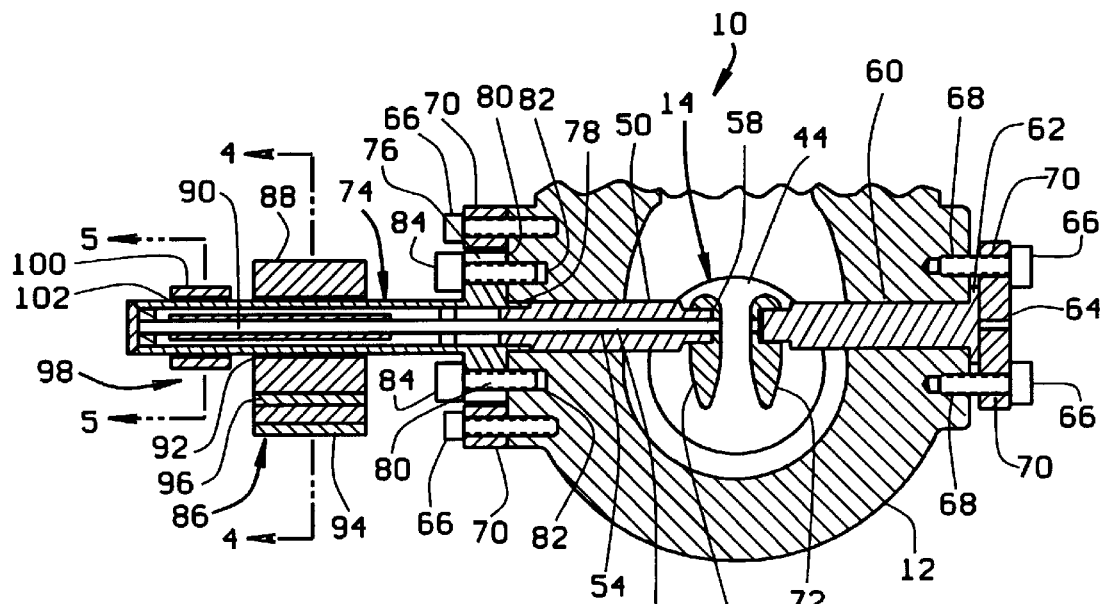
FIG. 3 is a cross section view of the GDCS check valve shown in FIG. 1.

FIG. 3 is a cross section view of check valve shown in FIG. 1. As shown in FIG. 3, first hinge pin member 50 extends partially through counterweight main body portion 44 and is engaged to a first disk pin insert 52. Disk assembly 14 is rotatable relative to first hinge pin member 50. A bore 54 extends through first hinge pin member 50, and a shaft 56 extends through first hinge pin member bore 54 and is connected at a first end 58 to first disk pin insert 52. Shaft 56 is rotatable relative to first hinge pin member 50.

A second hinge pin member 60 is secured to valve body 12 and extends through valve body 12. A flange 62 of second hinge pin member 60 is tightly pressed against valve body 12 by a retainer 64 engaged to valve body 12 by bolts 66 which extend into openings 68 in valve body 12 through openings 70 in retainer 64. A second disk pin insert 72 is secured within counterweight main body portion 44, and second disk pin insert 72 is engaged to second disk pin member 60. First and second disk pin inserts 52 and 72 are integral with main body portion 44. The interface surfaces between inserts 52 and 54 and pin members 50 and 60 are coated with, for example, a cobalt-based alloy to form bearing surfaces to prevent disk assembly 14 from freezing and to keep friction low. Disk assembly 14 is rotatable relative to first and second hinge pin members 50 and 60.

An elongate housing 74 including a flange portion 76 and extension 78 is secured to valve body 12 by aligning openings 80 in flange portion 76 with openings 82 in valve body 12 and tightening bolts 84 in aligned openings 80 and 82. Housing extension 78 is press fit into engagement with first hinge pin member 50. Shaft 56 extends from first disk pin insert 52 through first hinge pin member 50 and within housing 74.

Valve 10 includes a motor 86 having a stator frame 88 and a motor armature 90. Armature 90 is located within housing 74, and motor armature 90 and shaft 56 extend through a stator bore 92 in stator frame 88. Motor armature 90 and shaft 56 are rotatable relative to stator frame 88. A stator winding 94 energizable to generate a rotating magnetic field extends through a slot 96 formed in stator frame 88.

An encoder 98 including an encoder shoe 100 also is mounted with respect to housing 74 so that armature 90 and shaft 56 extend through an opening 102 in encoder shoe 100. Encoder shoe 102 is constructed of magnetic material and generates a magnetic signal representative of the motion of magnetic armature 90. Detection circuitry (not shown), which is well known in the encoder art, is coupled to encoder 98 to provide a worker with an indication as to the direction and amount of rotation of armature 90.

Figure 4:
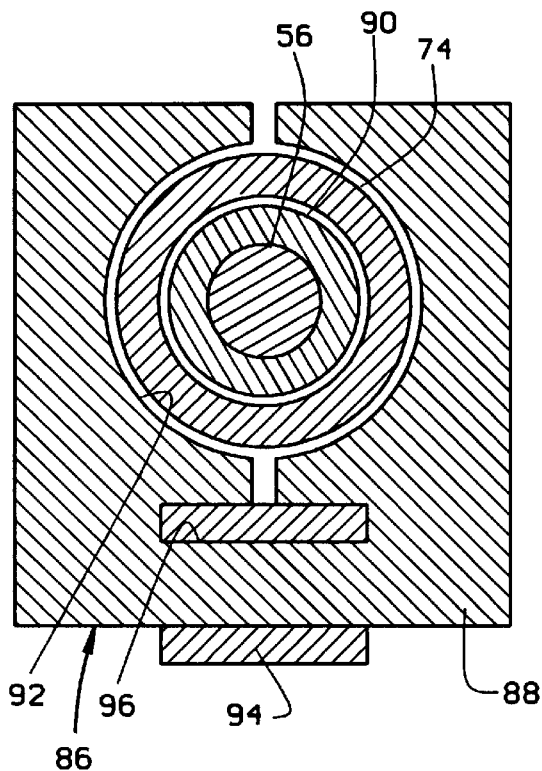
FIG. 4 is a cross section view through line 4—4 shown in FIG. 3.

FIG. 4 is a cross section view through line 4—4 shown in FIG. 3. More specifically, FIG. 4 is a cross section view through motor 86. As explained above, motor 86 includes stator frame 88 and motor armature 90. Armature 90 and shaft 56 extend through stator bore 92 in stator frame 88. Stator winding 94 extends through slot 96 formed in stator frame 88.

Figure 5:
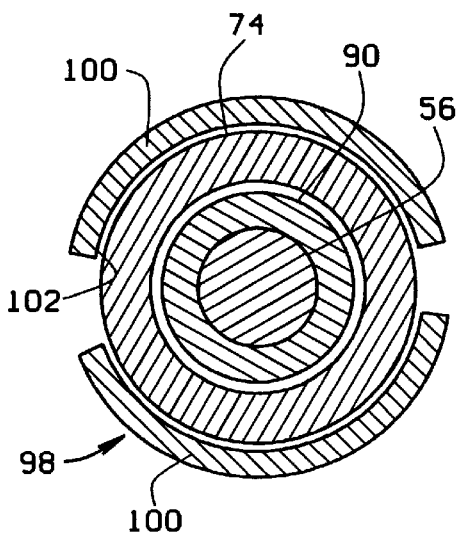
FIG. 5 is a cross section view through line 5—5 shown in FIG. 3.

FIG. 5 is a cross section view through line 5—5 shown in FIG. 3. More specifically, FIG. 5 is a cross section view through encoder 98. Encoder 98 includes shoes 100 which generate magnetic signals representative of the motion of armature 90. Detection circuitry (not shown) coupled to shoes 100 provides the worker with an indication as to the direction and amount of rotation of armature 90.

GDCS check valve 10 can be tested while the reactor is in operation, rather than only during refueling outages, and such testing will not interfere with valve operation if valve 10 is required to function. More specifically, at any time during reactor operation, and when it is desired to test the operability of check valve 10, stator winding 94 is energized which causes armature 90 to rotate. Disk assembly 14 can be fully rotated to its full open position, e.g., 60 degrees open, by energizing motor winding 94 in a first pole configuration, e.g., a first winding lead is energized positive and a second winding lead is energized negative. Disk assembly 14 can also be fully rotated to its full closed position by energizing motor winding 94 in a second pole configuration, e.g., the first winding lead is energized negative and the second winding lead is energized positive. If at any time while performing such testing during reactor operation, the GDCS squib valve fires, then valve 10 closes. That is, the torque provided by motor 86 is not large enough to overcome the force of the RPV backpressure.

Also, GDCS disk assembly 14 can be stroked over its entire range of motion to ensure that valve 10 has a full range of operability. By stroking assembly 14 over its entire range of motion, valve 10 can be fully tested to enable identification of all possible failures.

From the preceding description of the present invention, it is evident that the objects of the invention are attained. Although the invention has been described and illustrated in detail, it is to be clearly understood that the same is intended by way of illustration and example only and is not be taken by way of limitation. Accordingly, the spirit and scope of the invention are to be limited only by the terms of the appended claims.

What is claimed is:

1. A check valve for use in a gravity driven cooling system of a nuclear reactor, said check valve comprising:
    a valve body having a coolant flow channel extending therethrough and a valve body seat on an inner surface thereof, said coolant flow channel comprising an inlet end and an outlet end;
    a disk assembly comprising a counterweight and a disk base, said counterweight secured to said disk base, said disk base comprising a disk assembly seat for seating with said valve body seat to resist coolant flow from said outlet end to said inlet end, said disk assembly further comprising a first disk pin insert;
    a first hinge pin member extending at least partially through said disk assembly and rotatable engaged to said first disk pin insert, said disk assembly being rotatable relative to said first hinge pin member, a bore extending through said first hinge pin member;
    a shaft extending through said first hinge pin member and connected at a first end to said first disk pin insert, said shaft rotatable relative to said first hinge pin member; and
    a motor comprising a stator frame having a stator bore therein, an armature rotatably positioned within said stator bore, said shaft connected to said armature and rotatable therewith.

2. A check valve in accordance with claim 1 wherein a maintenance opening extends through said valve body and said check valve further comprises a removable cover secured to said valve body and closing said opening.

3. A check valve in accordance with claim 1 further comprising a second hinge pin member, said second hinge pin member secured to said valve body and extending through a second hinge pin opening in said valve body.

4. A check valve in accordance with claim 3 wherein said disk assembly further comprises a second disk pin insert secured within said counterweight, said second hinge pin insert engaged to said second disk pin insert, said disk assembly being rotatable relative to said second hinge pin member.

5. A check valve in accordance with claim 1 further comprising a housing secured to said valve body, said housing comprising a first end press fit into engagement with said first hinge pin member, said shaft extending from said first disk pin through said first hinge pin member and within said housing.

6. A check valve in accordance with claim 5 wherein said motor armature is located within said housing.

7. A check valve in accordance with claim 6 wherein said housing, said motor armature and said shaft extend through said stator bore in said stator frame.

8. A check valve in accordance with claim 7 further comprising an encoder comprising an encoder shoe, and wherein said housing, said armature and said shaft extend through said encoder shoe.

9. A check valve in accordance with claim 1 wherein said motor further comprises a stator winding energizable to generate a rotating magnetic field that couples with a magnetic field of said armature and causes said armature to rotate.

10. A check valve, comprising:
    a valve body having a coolant flow channel extending therethrough and a valve body seat on an inner surface thereof, said coolant flow channel comprising an inlet end and an outlet end;
    a disk assembly comprising a counterweight and a disk base, said counterweight secured to said disk base, said disk base comprising a disk assembly seat for seating with said valve body seat to resist coolant flow from said outlet end to said inlet end, said disk assembly further comprising a first disk pin insert and a second disk pin insert secured within said counterweight;
    a first hinge pin member extending at least partially through said disk assembly and rotatably engaged to said first disk pin insert, said disk assembly being rotatable relative to said first hinge pin member, a bore extending through said first hinge pin member;
    a second hinge pin member extending at least partially through said disk assembly and rotatably engaged to said second disk pin insert, said disk assembly being rotatable relative to said second hinge pin member;
    a shaft extending through said first hinge pin member and connected at a first end to said first disk pin insert, said shaft rotatable relative to said first hinge pin member;

a housing secured to said valve body, said housing comprising a first end press fit into engagement with said first hinge pin member, said shaft extending from said first disk pin insert through said first hinge pin member and within said housing; and a motor comprising a stator frame having a stator bore therein, an armature rotatably positioned within said stator bore, said shaft connected to said armature and rotatable therewith.

11. A check valve in accordance with claim 10 wherein a maintenance opening extends through said valve body and said check valve further comprises a removable cover secured to said valve body and closing said opening.

12. A check valve in accordance with claim 10 wherein said motor armature is located within said housing.

13. A check valve in accordance with claim 12 wherein said housing, said motor armature and said shaft extend through said stator bore in said stator frame.

14. A check valve in accordance with claim 13 further comprising an encoder comprising an encoder shoe, and wherein said housing, said armature and said shaft extend through said encoder shoe.

15. A check valve in accordance with claim 10 wherein said motor further comprises a stator winding energizable to generate a rotating magnetic field that couples with a magnetic field of said armature and causes said armature to rotate.

* * * * *